(12) United States Patent
Oh et al.

(10) Patent No.: US 12,069,419 B2
(45) Date of Patent: Aug. 20, 2024

(54) ELECTRONIC DEVICE

(71) Applicant: Samsung Electronics Co., Ltd., Suwon-si (KR)

(72) Inventors: Juntaek Oh, Suwon-si (KR); Myeounghyeoun Do, Suwon-si (KR); Taegyeong Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 17/851,776

(22) Filed: Jun. 28, 2022

(65) Prior Publication Data

US 2022/0417631 A1 Dec. 29, 2022

Related U.S. Application Data

(63) Continuation of application No. PCT/KR2022/009161, filed on Jun. 27, 2022.

(30) Foreign Application Priority Data

Jun. 28, 2021 (KR) .................. 10-2021-0084222

(51) Int. Cl.
*H04R 1/06* (2006.01)
*H04R 1/02* (2006.01)

(52) U.S. Cl.
CPC .............. *H04R 1/06* (2013.01); *H04R 1/025* (2013.01); *H04R 2420/07* (2013.01)

(58) Field of Classification Search
CPC .............. H04R 1/1016; H04R 2420/07; H04R 1/1025; H04R 1/1075; H04R 1/1041;
(Continued)

(56) References Cited

U.S. PATENT DOCUMENTS 11,581,662 B2 * 2/2023 Yoon ..................... H01Q 1/44
11,785,399 B2 * 10/2023 Shenoy ............... H04R 25/554
381/315
(Continued)

FOREIGN PATENT DOCUMENTS

KR 10-2016-0105015 A 9/2016
KR 10-2016-0105907 A 9/2016
(Continued)

OTHER PUBLICATIONS

International Search Report dated Oct. 6, 2022, issued in International Application No. PCT/KR2022/009161.

*Primary Examiner* — Lun-See Lao
(74) *Attorney, Agent, or Firm* — Jefferson IP Law, LLP

(57) ABSTRACT

An electronic device is provided. The electronic device includes a housing, a battery, which is disposed in an inner space of the housing, includes a first surface facing a first direction, a second surface facing a second direction different from the first direction, a third surface facing a third direction different from the first direction and the second direction, and a first electrode disposed on the first surface and a second electrode disposed on the second surface, a printed circuit board including a first part disposed to be spaced a predetermined distance apart from the first surface of the battery, a power management circuit configured to provide power used for an operation of the electronic device to at least one electronic component disposed inside the electronic device by using power of the battery, and a second part electrically connected to the battery and disposed to surround at least a part of the second surface and/or the third surface of the battery, an antenna electrically connected to the printed circuit board and configured to communicate with an external electronic device, and a connection member disposed on the first surface of the battery and configured to (Continued)

electrically connect the first part of the printed circuit board and the first electrode of the battery.

20 Claims, 12 Drawing Sheets

(58) Field of Classification Search
CPC .............. H04R 1/1066; H04R 2420/03; H04R 2460/03; H04R 1/025; H04R 1/06; H04R 1/10; H04R 2225/025; H04R 2225/51; H04R 25/55; H04R 25/60; H04R 25/65; H04R 3/00; H04R 5/033; H04M 1/0262; H04M 2250/12; H04M 3/5116; H04L 25/0272; H04W 84/18
USPC .......................................... 381/112, 322, 323
See application file for complete search history.

(56) References Cited

U.S. PATENT DOCUMENTS

| 2016/0255733 | A1 | 9/2016 | Jung et al. |
| 2018/0070179 | A1 | 3/2018 | Mcauliffe et al. |
| 2018/0241117 | A1* | 8/2018 | Hirsch .................. H01Q 1/273 |
| 2018/0261914 | A1 | 9/2018 | Kerselaers et al. |
| 2020/0221209 | A1* | 7/2020 | Grebe ................. H01M 50/216 |
| 2021/0014598 | A1 | 1/2021 | Pine et al. |
| 2021/0136477 | A1* | 5/2021 | Ozawa ................. H04R 19/016 |
| 2021/0176557 | A1 | 6/2021 | Schreuder |
| 2022/0159363 | A1 | 5/2022 | Yang et al. |

FOREIGN PATENT DOCUMENTS

| KR | 10-2489875 B1 | 1/2018 |
| KR | 10-2021-0041572 A | 4/2021 |

* cited by examiner

ELECTRONIC DEVICE

CROSS-REFERENCE TO RELATED APPLICATION(S)

This application is a continuation application, claiming priority under § 365(c), of an International application No. PCT/KR2022/009161, filed on Jun. 27, 2022, which is based on and claims the benefit of a Korean patent application number 10-2021-0084222, filed on Jun. 28, 2021, in the Korean Intellectual Property Office, the disclosure of which is incorporated by reference herein in its entirety.

TECHNICAL FIELD

The disclosure relates to a wearable electronic device including a speaker.

BACKGROUND ART

An electronic device may have at least one component disposed therein and related to sound effects. The component related to sound effects may be, for example, a speaker, and such a component may be disposed inside a housing in various forms and structures according to dispositional relation with outer components (for example, battery) and/or exterior design of the electronic device designed variously. Electronic devices including a speaker may include, for example, a wearable electronic device which can be worn near a user's ear, such as a wireless earphone or a hearing aid. Such a wearable electronic device may have a microphone additionally disposed inside the housing to perform an active noise cancellation (ANC) function.

A wearable electronic device including a speaker may be connected to other electronic devices and used. To this end, a wearable electronic device may include an antenna for wireless communication with an external electronic device, and the antenna may be used not only to improve the sound quality of a wireless earphone (for example, ANC function), but also to implement true wireless stereo (TWS) technology for ensuring every level of user convenience. To implement the TWS technology, a wearable electronic device may have a battery having a larger capacity and a higher energy density.

In some embodiments, a cylindrical battery or coin cell battery may be used to supply power in the case of a small-sized electronic device. The coin cell battery can be manufactured to have a noticeably smaller volume than the cylindrical battery, and use of the coin cell battery can thus improve the degree of freedom in connection with the electronic device design and satisfy the demand for smallness/compactness of the electronic device.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

When a wearable electronic device includes a coin cell battery, the coin cell may be formed to have an overlapped structure with other electronic components included in the housing. For example, the coin cell battery may form an overlapped structure with various electronic components including a speaker and/or a microphone, various conductive circuits for inputting/outputting electric signals with the speaker and/or microphone, a circuit board on which the conductive circuits are printed (hereinafter, referred to as "printed circuit board"), and a power management circuit (protection circuit module (PCM)/battery management system (BMS)) configured to protect the circuits and/or manage the battery power.

A coin cell battery commonly has positive and negative electrodes facing in opposite directions, and, in some embodiments, in order to connect the positive and negative electrodes of the coin cell, a U-shaped printed circuit board having contact parts that can contact the positive and negative electrodes, respectively, may be used, for example. However, such contact structures for connecting the positive and negative electrodes of the coin cell battery, respectively, may place restrictions on reducing the volume/size of the electronic device because the same need to be disposed above and below the coin cell, respectively.

Furthermore, in connection with designing an antenna for implementing the TWS technology for a wearable electronic device, the small volume of the wearable electronic device and the narrow space inside the housing, combined with a conductive member disposed adjacent to the antenna, may degrade the antenna performance. The wearable electronic device may generate a parasitic resonance pattern through the coin cell battery disposed inside the housing and the printed circuit board electrically connected to the coin cell battery, and this may degrade the antenna performance.

Aspects of the disclosure are to address at least the above-mentioned problems and/or disadvantages and to provide at least the advantages described below. Accordingly, an aspect of the disclosure is to provide a wearable electronic device having a coin cell battery configured to form an overlapped structure with other components while reducing the volume/size of the electronic device.

Another aspect of the disclosure is to provide a wearable electronic device capable of improving antenna performance and removing a parasitic resonance pattern.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing, a battery, which is disposed in an inner space of the housing, including a first surface facing a first direction, a second surface facing a second direction different from the first direction, a third surface facing a third direction different from the first direction and the second direction, and a first electrode disposed on the first surface and a second electrode disposed on the second surface, a printed circuit board including a first part disposed to be spaced a predetermined distance apart from the first surface of the battery, a power management circuit configured to provide power used for an operation of the electronic device to at least one electronic component disposed inside the electronic device by using power of the battery, and a second part electrically connected to the battery and disposed to surround at least a part of the second surface and/or the third surface of the battery, an antenna electrically connected to the printed circuit board and configured to communicate with an external electronic device, and a connection member disposed on the first surface of the battery and configured to electrically connect the first part of the printed circuit board and the first electrode of the battery.

In accordance with another aspect of the disclosure, a wearable electronic device capable of implementing a true wireless stereo (TWS) function is provided. The wearable electronic device including a housing, a battery which is disposed in an inner space of the housing, a first surface facing a first direction, a second surface facing a second direction different from the first direction, a third surface facing a third direction different from the first direction and the second direction, and a negative electrode disposed on the first surface and a positive electrode disposed on the second surface, a first printed circuit board, which is disposed to be spaced a predetermined distance apart from the first surface of the battery, including a power management circuit configured to provide power used for an operation of the electronic device to at least one electronic component disposed inside the electronic device by using power of the battery, a second printed circuit board electrically connected to the battery, disposed to surround at least a part of the third surface of the battery, and contacted with the first printed circuit board on the third surface, an antenna electrically connected to the first printed circuit board, adjacently disposed in the first direction of the first printed circuit board, and configured to communicate with an external electronic device, and a connection member disposed on the first surface of the battery and configured to electrically connect the first printed circuit board and the negative electrode of the battery.

Advantageous Effects

Various embodiments of the disclosure may provide a wearable electronic device wherein electric connection between positive and negative electrodes of a coin cell battery and a printed circuit board is implemented on a side surface part of the coin cell battery such that the volume/size of the electronic device can be reduced while having a coin cell battery that forms an overlapped structure with other components.

Furthermore, according to various embodiments of the disclosure, in connection with electric connection between a coin cell battery and a printed circuit board having a power management circuit disposed thereon, an additional electric connection path may be provided by using a connection member, thereby securing a ground area. This may remove a parasitic resonance pattern and improve the antenna performance.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

Figure 1:
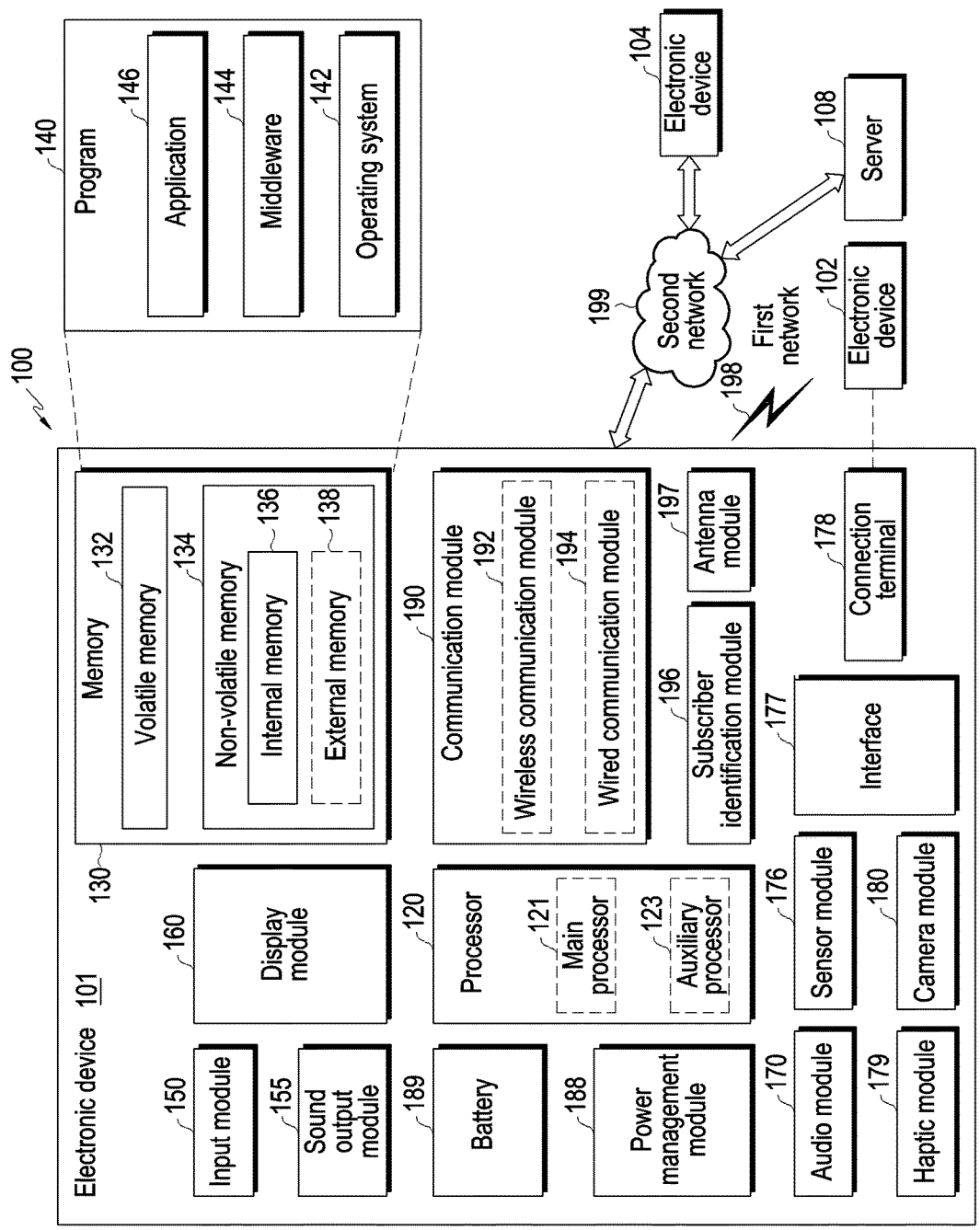
FIG. 1 is a block diagram of an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before describing various embodiments of the disclosure in detail, it will be appreciated that application thereof is not limited to the details of configurations and arrangements of elements described in the following detailed description or illustrated in the drawings.

In addition, in the case where a predetermined element is described as being connected or coupled to another element, although the element may be directly connected or coupled to the corresponding element, it should be understood that another element may be interposed therebetween.

In addition, "connection" herein may include direct connection or indirect connection between one member and another member, and may indicate all physical connections and electrical connections such as adhesion, attachment, fastening, bonding, and coupling.

The terms used in the disclosure are merely used to describe specific embodiments, and are not intended to limit the disclosure. A singular expression includes a plural expression unless the context clearly indicates otherwise. As used herein, terms such as "include" or "have" are intended to specify the existence of features, numbers, steps, operations, elements, components, or combinations thereof described herein, and should be understood as not excluding in advance the possibility of existence or addition of one or more other features, numbers, steps, operations, elements, components, or combinations thereof.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
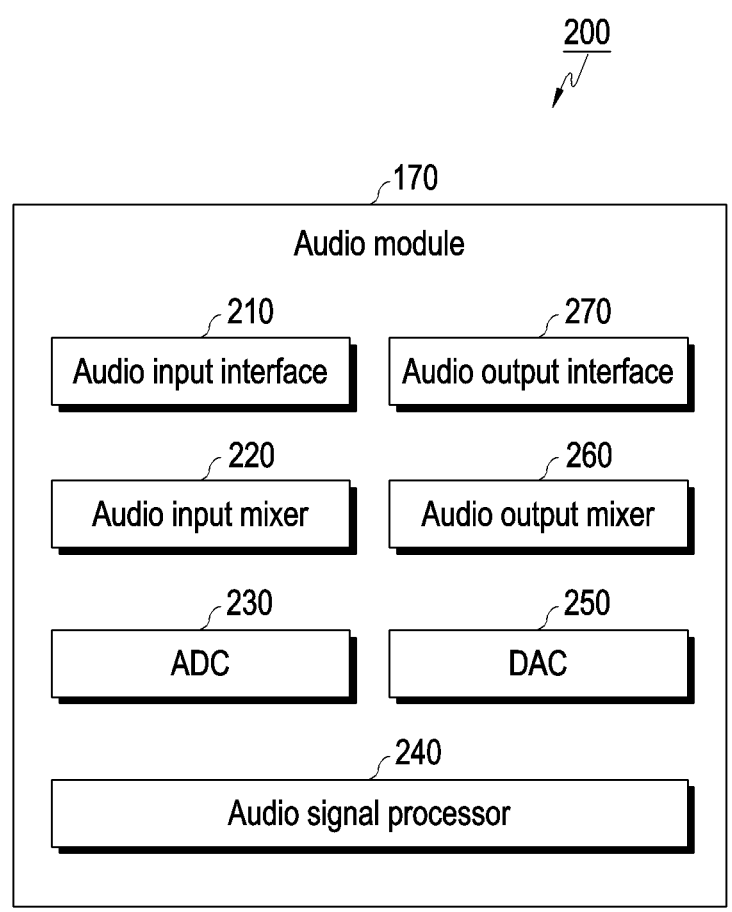
FIG. 2 is a block diagram of an audio module according to an embodiment of the disclosure.

FIG. 2 is a block diagram 200 of the audio module 170 according to an embodiment of the disclosure.

Referring to FIG. 2, the audio module 170 may include, for example, an audio input interface 210, an audio input mixer 220, an analog to digital converter (ADC) 230, an audio signal processor 240, a digital to analog converter (DAC) 250, an audio output mixer 260, or an audio output interface 270.

Referring to FIGS. 1 and 2 together, the audio input interface 210 may receive an audio signal corresponding to a sound obtained from the outside of the electronic device 101 through a microphone (e.g., a dynamic microphone, a condenser microphone, or a piezo microphone) configured as a part of the input module 150 or configured separately from the electronic device 101. For example, when an audio signal is obtained from the external electronic device 102 (e.g., a headset or a microphone), the audio input interface 210 may be directly connected to the external electronic device 102 through the connection terminal 178 or wirelessly (e.g., Bluetooth communication) connected thereto through the wireless communication module 192 to receive an audio signal. According to an embodiment, the audio input interface 210 may receive a control signal (e.g., a volume adjustment signal received through an input button) related to an audio signal obtained from the external electronic device 102. The audio input interface 210 may include a plurality of audio input channels, and receive a different audio signal for each corresponding audio input channel among the plurality of audio input channels. According to an embodiment, additionally or alternatively, the audio input interface 210 may receive an audio signal from another element (e.g., the processor 120 or the memory 130) of the electronic device 101.

The audio input mixer 220 may synthesize a plurality of input audio signals into at least one audio signal. For example, according to an embodiment, the audio input mixer 220 may synthesize a plurality of analog audio signals input through the audio input interface 210 into at least one analog audio signal.

The ADC 230 may convert an analog audio signal into a digital audio signal. For example, according to an embodiment, the ADC 230 may convert an analog audio signal received through the audio input interface 210, or additionally or alternatively, an analog audio signal synthesized through the audio input mixer 220 into a digital audio signal.

The audio signal processor 240 may perform various processing with respect to a digital audio signal input through the ADC 230 or a digital audio signal received from another element of the electronic device 101. For example, according to an embodiment, the audio signal processor 240 may perform a change of a sampling ratio for one or more digital audio signals, an application of one or more filters, interpolation processing, amplification or attenuation of all or a part of a frequency band, noise processing (e.g., noise or echo attenuation), a channel change (e.g., a switch between mono and stereo), mixing, or specified signal extraction. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another element (e.g., the processor 120 or the memory 130) of the electronic device 101 into an analog audio signal.

The audio output mixer 260 may synthesize, into at least one audio signal, a plurality of audio signals to be output. For example, according to an embodiment, the audio output mixer 260 may synthesize an audio signal converted into an analog signal through the DAC 250 and another analog audio signal (e.g., an analog audio signal received through the audio input interface 210) into at least one analog audio signal.

The audio output interface 270 may output an analog audio signal converted through the DAC 250, or additionally or alternatively, an analog audio signal synthesized by the audio output mixer 260 to the outside of the electronic device 101 through the sound output module 155. The sound output module 155 may include, for example, a receiver or a speaker such as a dynamic driver or a balanced armature driver. According to an embodiment, the sound output module 155 may include a plurality of speakers. In this case, the audio output interface 270 may output an audio signal having a plurality of different channels (e.g., stereo or 5.1 channel) through at least some speakers among the plurality of speakers. According to an embodiment, the audio output interface 270 may be directly connected to the external electronic device 102 (e.g., an external speaker or a headset) through the connection terminal 178 or wirelessly connected thereto through the wireless communication module 192 to output an audio signal.

According to an embodiment, the audio module 170 may not separately include the audio input mixer 220 or the audio output mixer 260, and synthesize a plurality of digital audio signals by using at least one function of the audio signal processor 240, so as to generate at least one digital audio signal.

According to an embodiment, the audio module 170 may include an audio amplifier (not shown) (e.g., a speaker amplification circuit) capable of amplifying an analog audio signal input through the audio input interface 210 or an audio signal to be output through the audio output interface 270. According to an embodiment, the audio amplifier may be configured as a module separate from the audio module 170.

Figure 3:
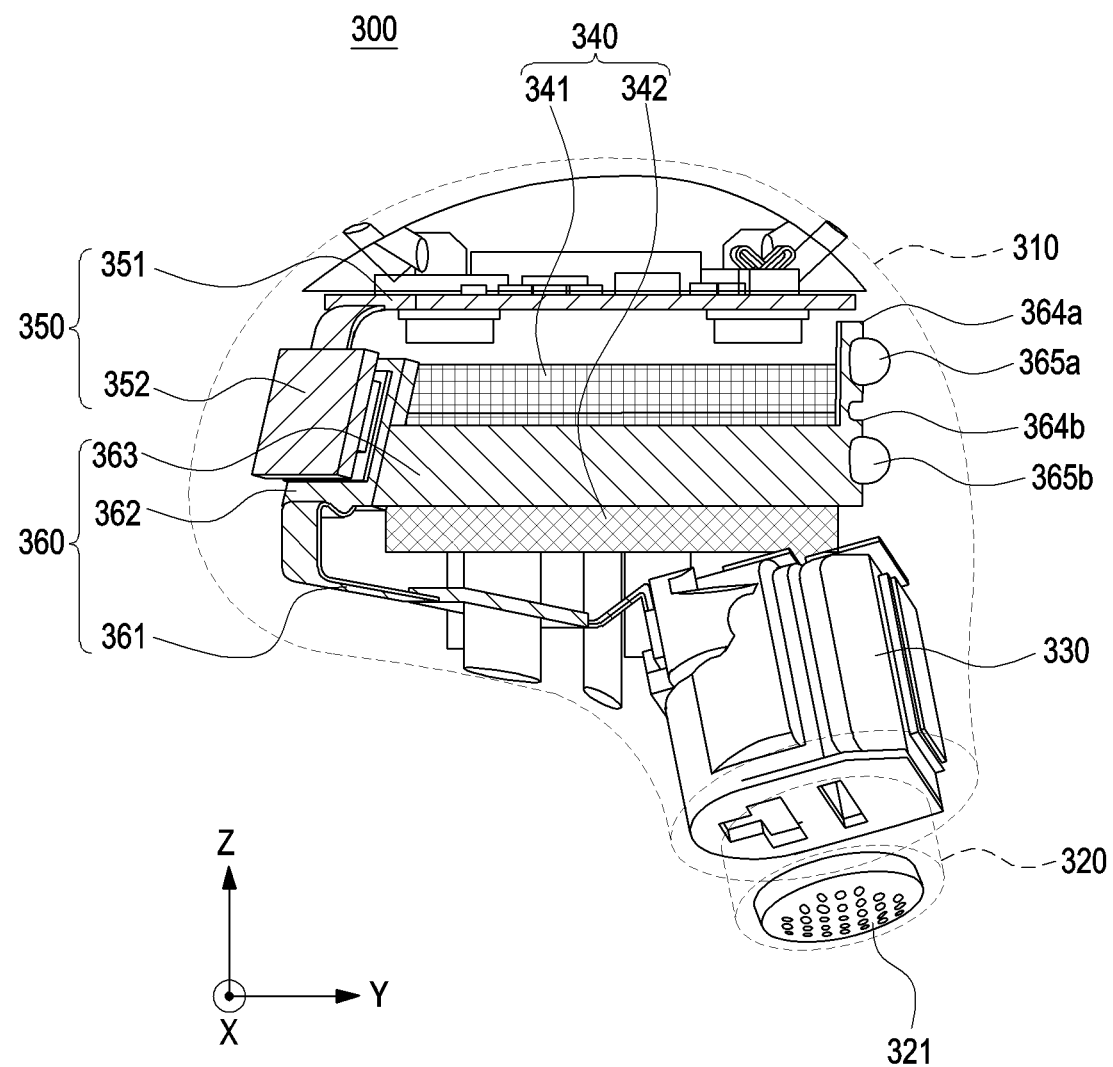
FIG. 3 illustrates an electronic device according to an embodiment of the disclosure.

FIG. 3 illustrates an electronic device according to an embodiment of the disclosure.

Figure 4:
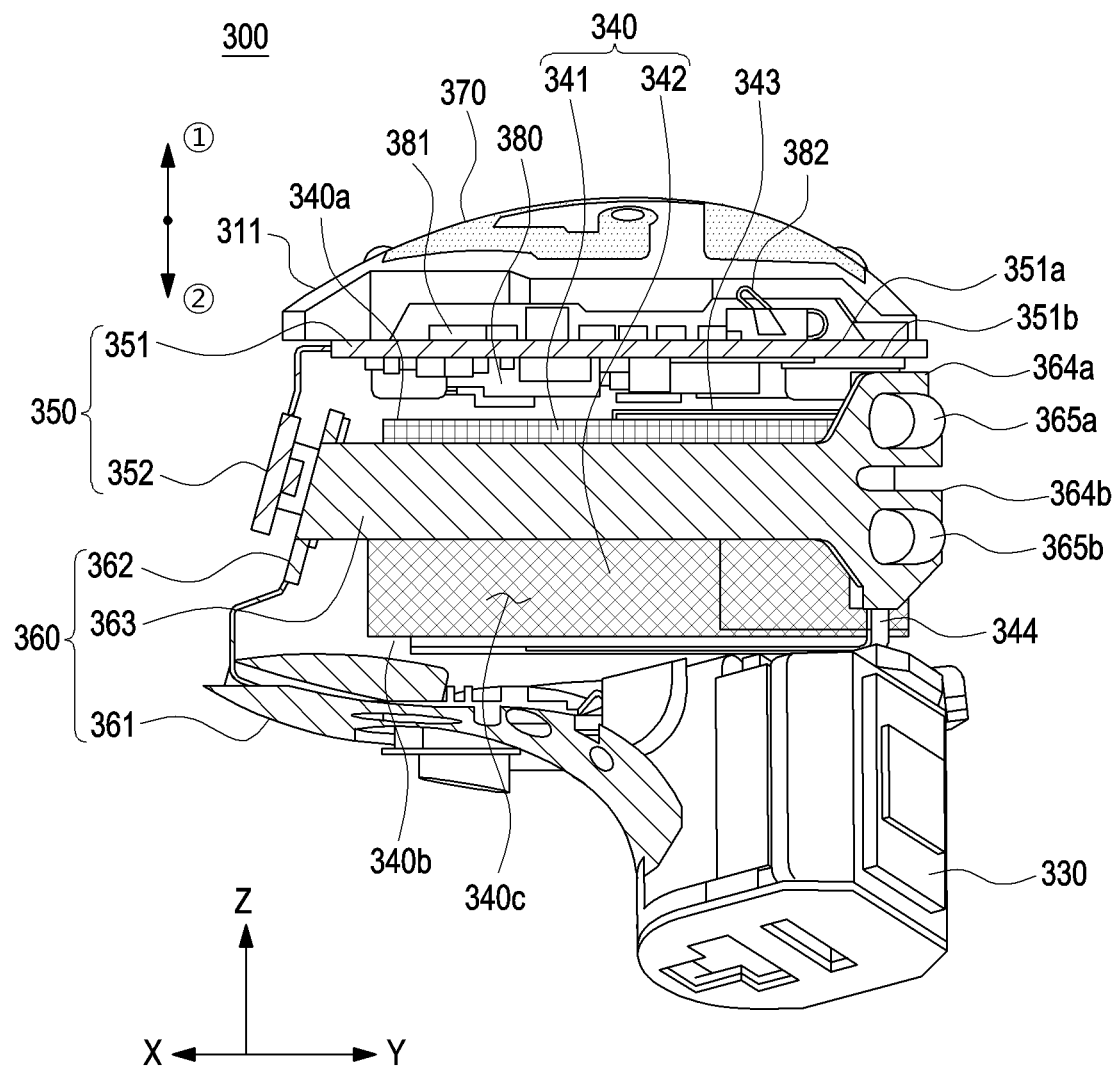
FIG. 4 illustrates an electronic device excluding a housing in the embodiment shown in FIG. 3 according to an embodiment of the disclosure.

FIG. 4 illustrates an electronic device excluding a housing in the embodiment shown in FIG. 3 according to an embodiment of the disclosure.

Referring to FIGS. 3 and 4 and subsequent figures, as an electronic device (e.g., the electronic device 101 of FIG. 1), a wearable electronic device 300 is described as an example. For convenience of description, the wearable electronic device 300 is exemplified as an embodiment of the disclosure. However, it should be noted that the scope of the disclosure is not necessarily limited to the type and form of the wearable electronic device 300 shown in the drawings.

The wearable electronic device 300 according to an embodiment of the disclosure may correspond to a device which can be worn on a part of the body, for example, an ear or head. As an example of the wearable electronic device 300, a wireless earphone (or an in-ear earset) or a hearing aid may be included, and in addition, various product groups in which a speaker or a microphone is disposed may be included.

In various drawings of the disclosure, as an example of the wearable electronic device 300, a kernel-type in-ear earset mainly mounted in an external auditory canal running from a pinna to an eardrum may be described as an object thereof. However, it should be noted that the disclosure is not limited thereto. According to another embodiment, although not shown in the drawings, the wearable electronic device 300 may be an open-type earset mounted on a pinna.

FIG. 3 illustrates directional component X, directional component Y, and directional component Z. The direction component X, the direction component Y, and the direction component Z are orthogonal to each other, and may form a spatial coordinate system defined by the X axis, Y axis, and Z axis. For example, the directional component X may represent a horizontal width direction of the wearable electronic device 300, the directional component Y may represent a vertical width direction of the wearable electronic device 300, and the directional component Z may represent a height direction of the wearable electronic device 300. According to an embodiment of the disclosure, the directional component Z may indicate a first direction which is a direction in which a first surface (hereinafter, a first surface 340a of FIG. 4) of a battery faces, and/or a second direction which is a direction in which a second surface (hereinafter, a second surface 340b of FIG. 4) of the battery faces. For example, as shown in FIG. 4, the direction component Z may be parallel to the first direction ① which is the direction in which the first surface of the battery faces, and may face the opposite direction to the second direction ② which is the direction in which the second surface of the battery faces. In the following description, the first direction ① which is the direction in which the first surface of the battery faces and the second direction ② which is the direction in which the second surface of the battery faces are merely provided for convenience of description in describing an overlapped structure between the battery and other elements included in the electronic device 300, and do not indicate a predetermined specific direction.

Referring to FIG. 3, a housing 310 of the wearable electronic device 300 according to an embodiment of the disclosure may include a protrusion portion 320 and opening 321. The housing 310 may form a space for allowing the various components mounted therein. For example, sound components (e.g., a speaker and/or a microphone) and electronic components (e.g., a battery, a power management circuit, a wireless communication module, etc.) may be arranged inside the housing 310. The power management circuit may correspond to, for example, a protection circuit module (PCM) or a power management system (battery management system (BMS)), or correspond to a form in which the protection circuit module and the power management system are integrated. The protrusion portion 320 may be a part coupled to protrude in one direction from one side of the housing 310. The wearable electronic device 300 may be inserted and mounted in at least a part of the body (an external auditory canal or at least a pinna of the body) by using the protrusion portion 320. An ear tip may be additionally mounted to the protrusion portion 320, the electronic device may be in close contact with at least a part of the body through the ear tip (not shown), and thus more stably supported by at least a part of the body.

According to an embodiment, as shown in FIG. 3, the wearable electronic device 300 may have an asymmetric shape. The reason that the wearable electronic device 300 is formed to have an asymmetric shape is in terms of considering an ergonomic factor, but in terms of securing sound performance, an arrangement relationship between electronic components and sound components inside the housing 310 may be preferentially considered.

The wearable electronic device 300 (e.g., the electronic device 101 of FIG. 1) may be integrated into an electronic device (e.g., the electronic device 102 of FIG. 1), or configured separately from the electronic device (e.g., the electronic device 102 of FIG. 1). The electronic device (e.g., the electronic device 102 of FIG. 1) may correspond to various types of devices. The electronic device (e.g., the electronic device 102 of FIG. 1) may include, for example, a smartphone, a mobile phone, a navigation device, a game console, a television (TV), a vehicle head unit, a notebook computer, a laptop computer, a tablet computer, a personal media player (PMP), personal digital assistants (PDAs), a portable communication device, a computer device, a portable multimedia device, a portable medical device, a camera, a wearable device, or various household appliances. The electronic device according to the embodiment herein is not limited to the above-described devices.

The wearable electronic device 300 may be connected to an electronic device (e.g., the electronic device 102 of FIG. 1) by wire or wirelessly. In this case, in relation to the electronic device (e.g., the electronic device 102 of FIG. 1), the wearable electronic device 300 may serve as an audio output interface (or a sound output device (e.g., the sound output module 155 of FIG. 1)) configured to output a sound signal generated by the electronic device (e.g., the electronic device 102 of FIG. 1) to the outside. Additionally or alternatively, the wearable electronic device 300 disclosed herein may also serve as an audio input interface (or an input device (e.g., the input module 150 of FIG. 1)) for receiving an audio signal corresponding to a sound obtained from the outside of the electronic device (e.g., the electronic device 102 of FIG. 1).

Hereinafter, as an example, the wearable electronic device 300 may be described as being provided separately from the electronic device (e.g., the electronic device 102 of FIG. 1). Accordingly, in the following embodiments, the electronic device (e.g., the electronic device 102 of FIG. 1) may be referred to as an "external electronic device (e.g., the electronic device 102 of FIG. 1)" in the sense of being provided separately from the wearable electronic device 300.

When the wearable electronic device 300 is wirelessly connected to an external electronic device (e.g., the electronic device 102 of FIG. 1), the wearable electronic device 300 may communicate with the external electronic device via a network (e.g., a short-range wireless communication network or a long-range wireless communication network). The network is not limited thereto, but may include a mobile or cellular communication network, a local area network (LAN) (e.g., Bluetooth communication), a wireless local area network (WLAN), a wide area network (WAN), Internet, a small area network (SAN), or the like.

The wearable electronic device 300 may include a communication module. Further, the wearable electronic device 300 according to an embodiment may further include at least one of a power management circuit, a sensor module, a battery, and an antenna module. In an embodiment in which the wearable electronic device 300 is wirelessly connected to an external electronic device, the communication module may correspond to a wireless communication module. In addition, the wearable electronic device 300 according to an embodiment may further include an audio module (e.g., the audio module 170 of FIG. 1) in addition to the elements according to the above-described embodiments, and the audio module may be integrated into the inside of the housing 310 of the wearable electronic device 300 in a compact structure. The audio module (e.g., the audio module 170 of FIG. 1) may include, for example, an audio input mixer (e.g., the audio input mixer 220 of FIG. 2), an analog to digital converter (ADC) (e.g., the ADC 230 of FIG. 2), an audio signal processor (e.g., the audio signal processor 240 of FIG. 2), a digital to analog converter (DAC) (e.g., the DAC 250 of FIG. 2), or an audio output mixer (e.g., the audio output mixer 260 of FIG. 2). The description of each configuration of the audio module included in the wearable electronic device 300 will be omitted in the range overlapping with the embodiment described in FIG. 2.

According to an embodiment, the wearable electronic device 300 may not communicate with an external electronic device (e.g., the electronic device 102 of FIG. 1). In this case, the wearable electronic device 300 is not controlled through the external electronic device (e.g., the electronic device 102 of FIG. 1), and may be implemented to receive a signal corresponding to a sound obtained from the outside according to an operation (or control) of the components included in the wearable electronic device 300 themselves, and output a sound signal to the outside. For example, the wearable electronic device 300 may be a stand-alone electronic device which reproduces music or a video by itself without communicating with an external electronic device and outputs a corresponding sound, or receives and processes a user's voice.

According to another embodiment, the wearable electronic device 300 may communicate with and/or be controlled by an external electronic device (e.g., the electronic device 102 of FIG. 1). The wearable electronic device 300 may be an interaction type electronic device which is paired with an external electronic device (e.g., the electronic device 102 of FIG. 1) such as a smartphone via a communication scheme such as Bluetooth, and converts data received from the external electronic device (e.g., the electronic device 102 of FIG. 1) to output a sound, or receives a user's voice and transmits the same to the external electronic device.

Each configuration included in the wearable electronic device 300 according to an embodiment of the disclosure will be described with reference to FIGS. 3 and 4 together.

The wearable electronic device 300 may include a battery 340 which is disposed in an inner space of the housing 310 and includes a first surface 340a facing a first direction, a second surface 340b facing a second direction different from the first direction, and a third surface 340c facing a third direction different from the first direction and the second direction.

According to an embodiment, the battery 340 may be configured as a coin-shaped coin cell battery. The coin cell battery may be configured by winding or overlapping a laminate of a separator, a negative electrode plate, and a positive electrode plate formed in a thin plate or film shape. For example, the coin cell battery may include a jelly-roll type electrode assembly formed by rolling a laminate of a separator, a negative electrode plate, and a positive electrode plate. For another example, the coin cell battery may include a stacked type electrode assembly formed by overlapping a laminate of a separator, a negative electrode plate, and a positive electrode plate. A sealing member (e.g., CAN) may be formed on the outer surface of the coin cell battery to protect a battery cell by covering at least a part of the battery cell and to prevent leakage of an electrolyte solution inside the battery cell.

The battery 340 may have a first electrode 341 formed on the first surface 340a, and a second electrode 342 formed on the second surface 340b. In an embodiment, in the coin cell battery, a tab and a lead of a positive electrode are formed on one side of the battery cell, and a direction in which the tab and the lead of the positive electrode (hereinafter, referred to as "positive electrode" for short) are formed may face the opposite direction to a tab and a lead of a negative electrode (hereinafter, referred to as "negative electrode" for short), which are formed on the other side of the battery cell. For example, the coin cell battery may have a bidirectional type electrode terminal. According to an embodiment, a positive electrode terminal may be formed on one surface (e.g., the first surface 340a) of the battery 340, and a negative electrode terminal may be formed on the other surface (e.g., the second surface 340b) of the battery 340 facing the opposite direction of the one surface. On the contrary, in the disclosure, as an embodiment, a form in which a negative electrode terminal is formed on one surface (e.g., the first surface 340a) of the battery 340 and a positive electrode terminal is formed on the other surface (e.g., the second surface 340b) of the battery 340 facing the opposite direction of the one surface may be applied. The reason for applying the form in which a negative electrode terminal is formed on one surface (e.g., the first surface 340a) of the battery 340 and a positive electrode terminal is formed on the other surface (e.g., the second surface 340b) of the battery 340 facing the opposite direction of the one surface will be described later in the description of an embodiment (e.g., FIG. 6A or subsequent figures) in which a ground structure of an antenna is formed using a connection member.

Since the coin cell battery is small in size, the coin cell battery may be difficult to have a protection circuit module (PCM) in the battery cell or adjacent to the outside of the battery. Accordingly, the wearable electronic device 300 according to an embodiment of the disclosure may include a printed circuit board on which a protection circuit module (PCM) is disposed. The protection circuit module may perform an overcharge prevention function (over charge protection voltage), an over discharge prevention function (over discharge protection voltage), an overcurrent blocking function (over current protection/detection current), and/or a short-circuiting protection function (short protection/detection condition). In addition, additionally or alternatively, with respect to the above various functions, the protection circuit module may operate as a battery management system (BMS) including a function of monitoring information (e.g., a charge/discharge state, a voltage, a temperature, a pressure, etc.) on the battery and transmitting or controlling battery information by using wired/wireless communication, and a function of managing the remaining amount of the battery, a usable time, or a charge/discharge history. Accordingly, in describing the following embodiments, the protection circuit module may be referred to as a "power management circuit".

The wearable electronic device 300 may include at least one printed circuit board. For example, the at least one printed circuit board may include a first part disposed to be spaced a predetermined distance apart from the first surface 340a of the battery 340, and including a power management circuit 381 configured to provide power used for an operation of the wearable electronic device 300 to at least one electronic component 380 disposed inside the wearable electronic device 300 by using power of the battery 340. For another example, the at least one printed circuit board may include a second part electrically connected to the battery 340 and disposed to surround at least a part of the second surface 340b and/or the third surface 340c of the battery 340.

Referring to FIGS. 3 and 4 together, the first part and the second part of the printed circuit board may correspond to reference numerals 350 and 360, respectively. According to an embodiment, the printed circuit board may be configured in a form in which the first part and the second part are integrally connected, but, as shown in FIGS. 3 and 4, the printed circuit board may be configured in a form in which the first part and the second part may be substantially (or physically/electrically) separated from each other and can be connected to each other through at least one connector. In the following description, the first part and the second part of the printed circuit board are mainly described in a substantially (or physically/electrically) separated form, but the scope of an embodiment of the disclosure does not exclude the form in which the first part and the second part are integrally connected. In the form in which the first part and the second part of the printed circuit board are substantially (or physically/electrically) separated from each other, the first part of the printed circuit board may be referred to as a "first printed circuit board 350", and the second part of the printed circuit board may be referred to as a "second printed circuit board 360".

According to an embodiment, at least a part of the first printed circuit board 350 and/or the second printed circuit board 360 may be formed of a flexible printed circuit board (FPCB). At least a part of the first printed circuit board 350 and/or the second printed circuit board 360 is formed of the flexible printed circuit board, so that a conductive path between a plurality of elements in a narrow space of the housing 310 can be easily secured. According to an embodiment, the first printed circuit board 350 may include a first plate portion 351 on which at least one electronic component 380 is disposed, and a first connection portion 352, and the second printed circuit board 360 may include a first extension portion 361 for electrical connection with other electronic components which are not disposed on the first printed circuit board 350, a second connection portion 362, and a second extension portion 363 for electrical connection with the battery 340. According to an embodiment, the first printed circuit board 350 and the second printed circuit board 360 may be physically/electrically connected on the third surface 340c of the battery 340. For example, the first connection portion 352 (e.g., a connector) of the first printed circuit board 350 and the second connection portion 362 (e.g., a connector) of the second printed circuit board 360 may be coupled to each other on the third surface 340c of the battery 340.

According to an embodiment, the first printed circuit board 350 may be a part on which a plurality of electronic components 380 are disposed, and the plurality of electronic components 380 disposed on the first printed circuit board 350 may include, for example, the power management circuit 381 of the battery 340. According to an embodiment, the first printed circuit board 350 may include at least one electronic component on each of a surface 351a facing the first surface 340a of the battery 340 and a surface 351b facing the same direction as the first direction ① in which the first surface 340a faces. According to an embodiment, as shown in FIGS. 3 and 4, the first printed circuit board 350 may be disposed to overlap the battery 340 in the first direction ①. For example, the first printed circuit board 350 may be disposed to be spaced a predetermined distance apart from the first surface 340a of the battery 340 in the first direction ①.

The wearable electronic device 300 may include at least one support member disposed inside the housing 310. For example, the wearable electronic device 300 may include a support member 311 disposed between the first printed circuit board 350 and the housing 310 to support the first printed circuit board 350 and/or various electronic components. According to an embodiment, although not shown in the drawings, the wearable electronic device 300 may further include a spacer between the battery 340 and the first printed circuit board 350 to fill a space therebetween, or a bracket for supporting elements.

According to an embodiment, the second printed circuit board 360 may be configured to transmit power of the battery 340 to the first printed circuit board 350. According to an embodiment, the second printed circuit board 360 may be configured to supply power to electronic components which are not disposed on the first printed circuit board 350, such as a speaker 330. According to an embodiment, the second printed circuit board 360 may be configured to cover at least a part of the second surface 340b and/or the third surface 340c of the battery 340. For example, the first printed circuit board 350 may be configured to cover at least a part of the first surface 340a of the battery 340, and the second printed circuit board 360 may be configured to cover at least a part of the second surface 340b of the battery 340. For another example, the first printed circuit board 350 may be configured to cover at least a part of the first surface 340a of the battery 340, and the second printed circuit board 360 may be configured to cover at least a part of the third surface 340c of the battery 340. For still another example, as shown in FIGS. 3 and 4, the first printed circuit board 350 may be configured to cover at least a part of the first surface 340a of the battery 340, and the second printed circuit board 360 may be configured to cover at least a part of the second surface 340b and the third surface 340c of the battery 340.

According to an embodiment, when the first printed circuit board 350 covers at least a part of the first surface 340a of the battery 340 and the second printed circuit board 360 covers at least a part of the second surface 340b of the battery 340, the first printed circuit board 350 may be electrically connected to the first electrode 341 of the first surface 340a and the second printed circuit board 360 may be electrically connected to the second electrode 342 of the second surface 340b. According to an embodiment, connection members (not shown) arranged to be in electrical contact with the first surface 340a and the second surface 340b of the battery 340, respectively, may be disposed on one side of the first printed circuit board 350 and one side of the second printed circuit board 360. As such, in relation to the battery 340 in which the first electrode 341 and the second electrode 342 are not formed in the same direction but are formed in opposite directions, in the case of including a pair of connection members to connect the first electrode 341 and the second electrode 342 to the first printed circuit board 350 and the second printed circuit board 360, the size in a height direction of the electronic device increases, and thus the design of miniaturization/compactification of a product may be restricted.

According to an embodiment of the disclosure, electrical connection of the first electrode 341 and the second electrode 342 of the battery 340 with respect to the printed circuit board is implemented on a side surface (e.g., the third surface 340c) of the battery 340, so that restrictions on the design of miniaturization/compactification of a product can be reduced. According to an embodiment, a structure in which the first electrode 341 and the second electrode 342 of the battery 340 are connected to the second printed circuit board 360 on the side surface (e.g., the third surface 340c) of the battery 340 may be configured. Referring to FIGS. 3 and 4, the second printed circuit board 360 may include a first contact point portion 364a connected to the first electrode 341 of the battery 340 and a second contact point portion 364b connected to the second electrode, at an end part of the second extension portion 363. In an embodiment, the second printed circuit board 360 may be soldered to the first electrode 341 of the battery 340 at the first contact point portion 364a, and may be soldered to the second electrode 342 of the battery 340 at the second contact point portion 364b. For example, a first solder portion 365a may be formed in the first contact point portion 364a of the second printed circuit board 360 through a soldering operation between the first contact point portion 364a and a first electrode tab 343 of the battery 340, and a second solder portion 365b may be formed in the second contact point portion 364b of the second printed circuit board 360 through a soldering operation between the second contact point portion 364b and a second electrode tab 344 of the battery 340.

Hereinafter, an electrical connection structure between the first electrode 341 and the second electrode 342 of the battery 340 and the second printed circuit board 360 will be described in more detail with reference to FIG. 5.

Figure 5:
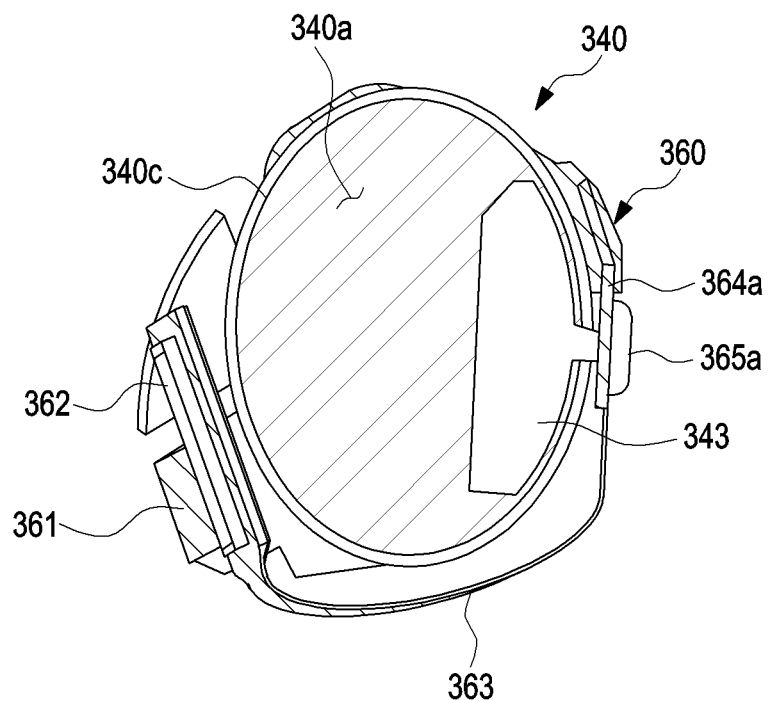
FIG. 5 illustrates an arrangement relationship between a battery and a second printed circuit board, according to an embodiment of the disclosure.
Figure 5:
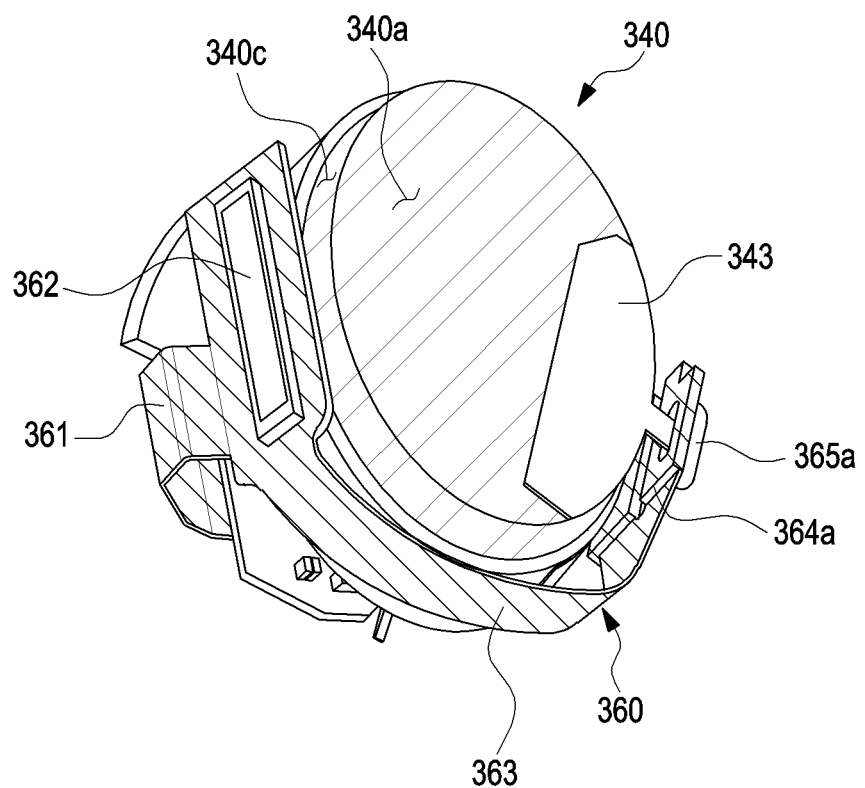

FIG. 5 illustrates an arrangement relationship between the battery 340 and the second printed circuit board 360, according to an embodiment of the disclosure.

Referring to FIGS. 4 and 5 together, the second printed circuit board 360 covering at least a part of the second surface 340b and the third surface 340c of the battery 340 is disclosed.

According to an embodiment, the first electrode tab 343 extending at least partially parallel to the first surface 340a may be formed on the first surface 340a of the battery 340, and the second electrode tab 344 extending at least partially parallel to the second surface 340b may be formed on the second surface 340b. According to an embodiment, the first electrode tab 343 and/or the second electrode tab 344 may be configured to include a plate part which is at least partially parallel to the first surface 340a or the second surface 340b and/or a curved part from the plate part toward the third surface 340c of the battery 340. For example, the battery 340 may include the first electrode tab 343 including a plate part parallel to the first surface 340a, as shown in FIG. 5, and the second electrode tab 344 including a plate part parallel to the second surface 340b and a curved part corresponding to the third surface 340c, as shown in FIG. 4. In addition, the shapes of the first electrode tab 343 and the second electrode tab 344 of the battery 340 may be variously applied according to embodiments. In performing a soldering operation with respect to the first electrode tab 343 and the second electrode tab 344 having various shapes as described above, for the stability of a solder joint structure and operation, the ease of managing the amount of lead used, etc., the wearable electronic device 300 according to an embodiment of the disclosure may provide the first solder portion 365a and the second solder portion 365b provided in the form of a recess before a soldering operation for ease of a soldering operation at designated positions of the first contact point portion 364a and the second contact point portion 364b, together with the first contact point portion 364a and the second contact point portion 364b in the second extension portion 363 of the second printed circuit board 360.

Referring back to FIG. 4, according to an embodiment of the disclosure, an embodiment including an antenna 370 may be described on the assumption that the wearable electronic device 300 communicates with and/or is controlled by an external electronic device (e.g., 102 of FIG. 1). According to an embodiment of the disclosure, various wireless communication schemes including the Bluetooth may be implemented using the antenna 370 included in the wearable electronic device 300. According to an embodiment, as the antenna 370, a laser direct structuring (LDS) antenna disposed on one side of the housing 310 or adjacent to the housing 310 may be applied. In relation to the antenna 370, for example, an LDS antenna including an antenna pattern formed by laser plating copper or nickel on the surface of the support member 311 formed of a thermoplastic resin may be applied.

According to an embodiment, the antenna 370 is disposed on the surface of the wearable electronic device 300 for ease of radiation, for example, one side of the housing 310 or adjacent to the housing 310, and thus the antenna may be disposed to be spaced apart from the first printed circuit board 350 on which various electronic components including a communication module and a processor (e.g., a communication processor) for controlling the antenna 370 are disposed. According to an embodiment, the antenna 370 may be disposed in the first direction of the first printed circuit board 350. For example, the antenna 370 may be disposed to be spaced a predetermined distance apart from the surface of the first printed circuit board 350 facing the first direction ①. In order to connect the antenna 370 and the first printed circuit board 350 spaced apart from each other, the wearable electronic device 300 may include a connection member (connection member) 382. For example, the connection member 382 may correspond to a c-clip as shown in FIG. 4, but is not necessarily limited thereto, and various types of members which electrically connect one element and other elements to each other, such as a conductive wire or a pogo pin, may be applied.

Figure 6A:
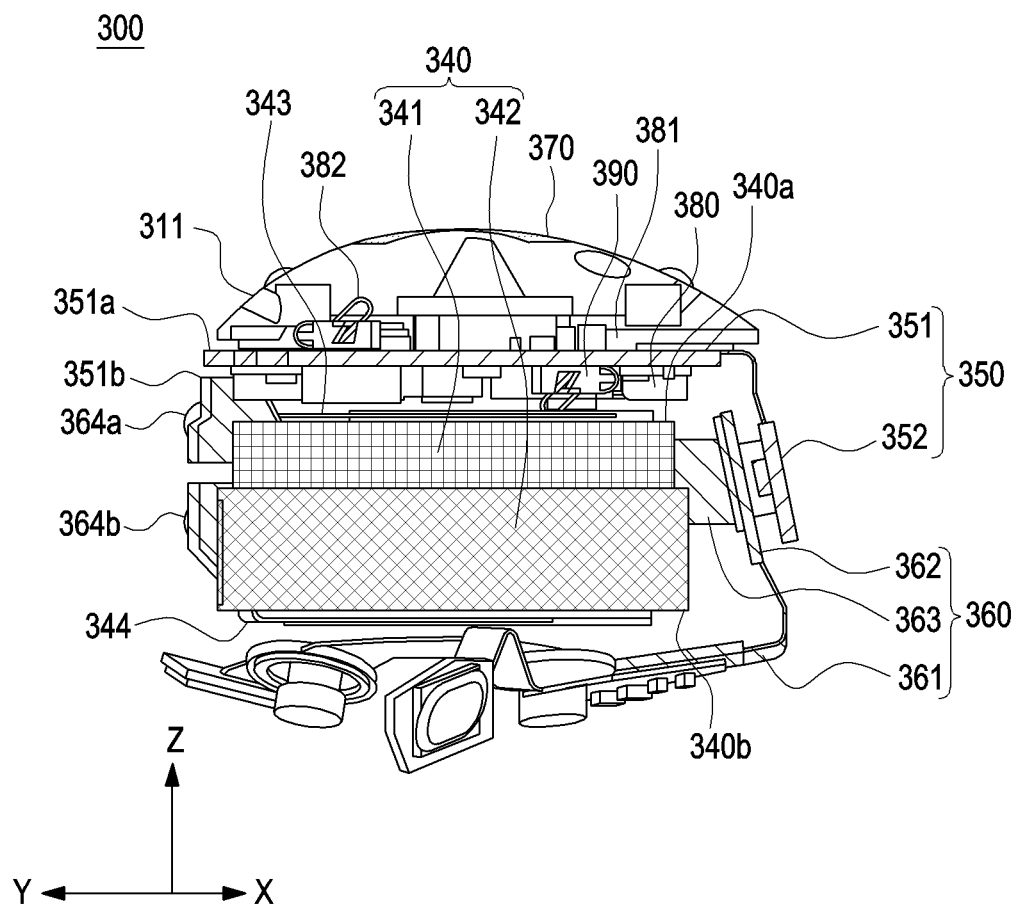
FIG. 6A illustrates an electronic device including a connection member, according to an embodiment of the disclosure.
Figure 6B:
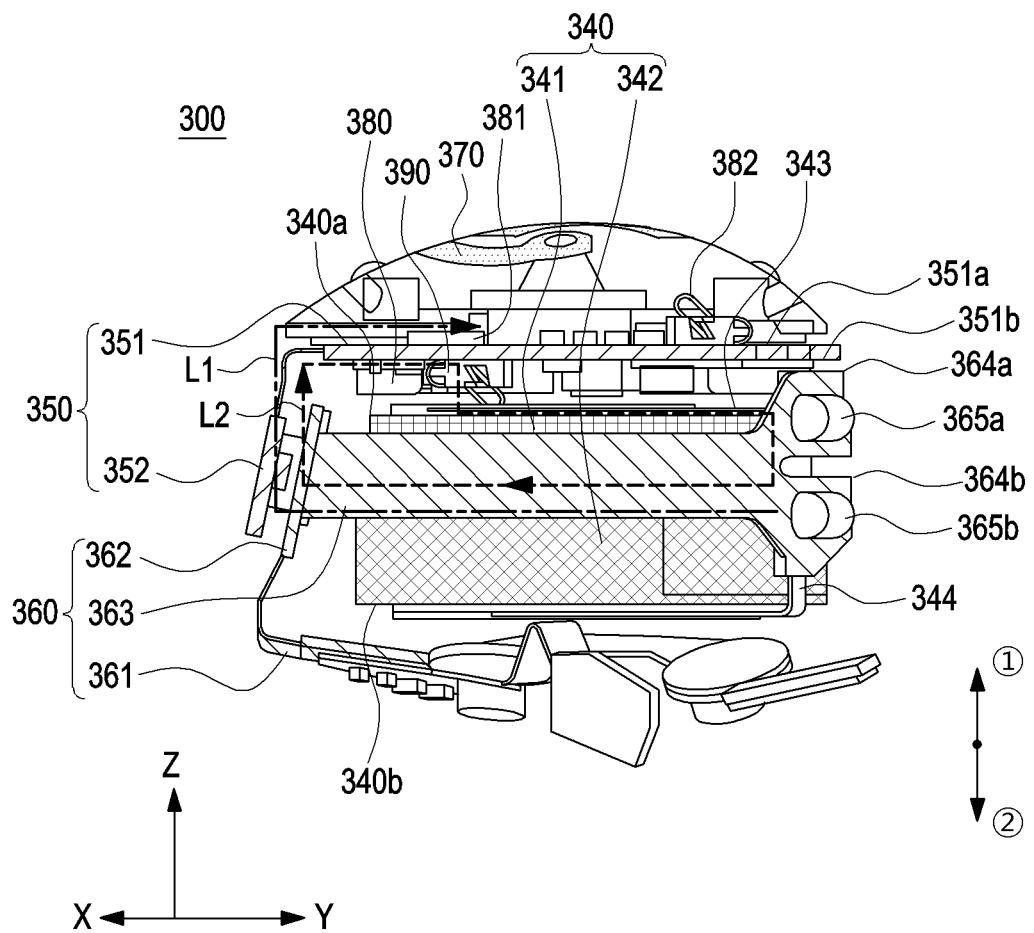
FIG. 6B illustrates an electrical connection path of an electronic device including a connection member, according to an embodiment of the disclosure.

FIG. 6A illustrates the electronic device 300 including a connection member, according to an embodiment of the disclosure. FIG. 6B illustrates an electrical connection path of the electronic device 300 including a connection member, according to an embodiment of the disclosure. In describing FIGS. 6A and 6B, the description overlapping that of the above-described embodiment will be omitted below.

Referring to FIG. 6A, the wearable electronic device 300 may include a connection member 390 disposed on the first surface 340a of the battery 340 and configured for electrical connection between the first printed circuit board 350 and the first electrode 341 of the battery 340.

According to an embodiment, the connection member 390 is provided separately from the connection member 382 to connect the antenna 370 and the first printed circuit board 350, and may be positioned between the first printed circuit board 350 and the first electrode 341 of the battery 340. According to an embodiment, the connection member 390 may be configured such that one side thereof is in contact with the first electrode 341 of the battery 340, for example, the first electrode tab 343 and the other side thereof is in contact with the power management circuit 381 of the first printed circuit board 350.

The shape of the connection member 390 may vary, for example, may be a c-clip shape shown in FIG. 6A, alternatively, unlike illustrated in the drawings, various types of members for electrically connecting one element and other elements to each other, such as a conductive wire or a pogo pin, may be applied.

According to an embodiment of the disclosure, the connection member 390 is disposed, and thus a parasitic resonance pattern of the antenna 370 may be removed and radiation performance of the antenna may be improved.

FIG. 6B illustrates an electrical movement path L1 of electric charge in the case where the connection member 390 is not disposed and an electrical movement path L2 of electric charge in the case where the connection member 390 is disposed. The electrical movement path L1 of the electric charge provided from the battery 340 in the case where the connection member 390 is not disposed may include the battery 340→the second extension portion 363 of the second printed circuit board 360→the second connection portion 362 of the second printed circuit board 360→the first connection portion 352 of the first printed circuit board 350→the first plate portion 351 of the first printed circuit board 350→the power management circuit 381. The electrical movement path L2 of the electric charge provided from the battery 340 in the case where the connection member 390 is disposed may include the battery 340→the second extension portion 363 of the second printed circuit board 360→the second connection portion 362 of the second printed circuit board 360→the first connection portion 352 of the first printed circuit board 350→the first plate portion 351 of the first printed circuit board 350→the power management circuit 381 and/or the battery 340→the connection member 390→the power management circuit 381. The electrical movement path L1 of the electric charge in the case where the connection member 390 is not disposed may have an open loop shape, whereas the electrical movement path L2 of the electric charge in the case where the connection member 390 is disposed may have a closed loop shape.

According to an embodiment of the disclosure, the first electrode 341 of the battery 340 may be configured as a negative (−) electrode, and the second electrode 342 may be configured as a positive (+) electrode. In this case, a stable ground form may be provided through the electrical movement path L2 of the electric charge in the case where the connection member 390 is disposed. For example, in the electrical movement path L1 of the electric charge in the case where the connection member 390 is not disposed, a phenomenon in which a ground is separated due to the electrical movement path L1 in a long and narrow open loop shape from the battery 340 to the first printed circuit board 350 may occur, and may cause an imbalance in current density, which may cause deterioration of the performance of the antenna 370. On the other hand, the electrical movement path L2 of the electric charge in the case where the connection member 390 is disposed is formed in a closed loop shape, so that the performance of the antenna 370 may be maintained or improved by taking a stable ground form.

According to an embodiment, a first electrical path L1 in the case where the connection member 390 is not disposed and a second electrical path L2 in the case where the connection member 390 is disposed are shown. The electrical path L1 in the case where the connection member 390 is not disposed may include at least some regions of the battery 340, the second extension portion 363 of the second printed circuit board 360, the second connection portion 362 of the second printed circuit board 360, the first connection portion 352 of the first printed circuit board 350, or the first plate portion 351 of the first printed circuit board 350. The electrical path L2 in the case where the connection member 390 is disposed may include at least some regions of the second extension portion 363 of the second printed circuit board 360, the second connection portion 362 of the second printed circuit board 360, the first connection portion 352 of the first printed circuit board 350, the first plate portion 351 of the first printed circuit board 350, or the connection member 390. The first electrical path L1 in the case where the connection member 390 is not disposed may have an open loop shape, whereas the second electrical path L2 in the case where the connection member 390 is disposed may have a closed loop shape. According to an embodiment, at the time of transmitting a communication signal (e.g., an RF signal) by using the antenna 370, the first electrical path L1 may have an open loop shape and an antenna characteristic. Accordingly, a part of an antenna signal is induced in the electrical path L1, and thus a parasitic resonance may occur. The connection member 390 is disposed, so that the open loop shape may be removed, a parasitic resonance of the antenna 370 may be removed, and the radiation performance of the antenna may be improved.

Figure 7A:
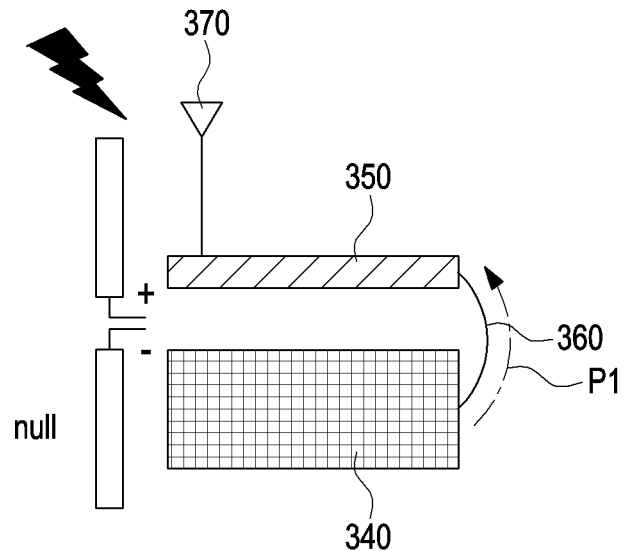
FIG. 7A is a schematic diagram illustrating antenna radiation performance of an electronic device not including a connection member, according to an embodiment of the disclosure.
Figure 7B:
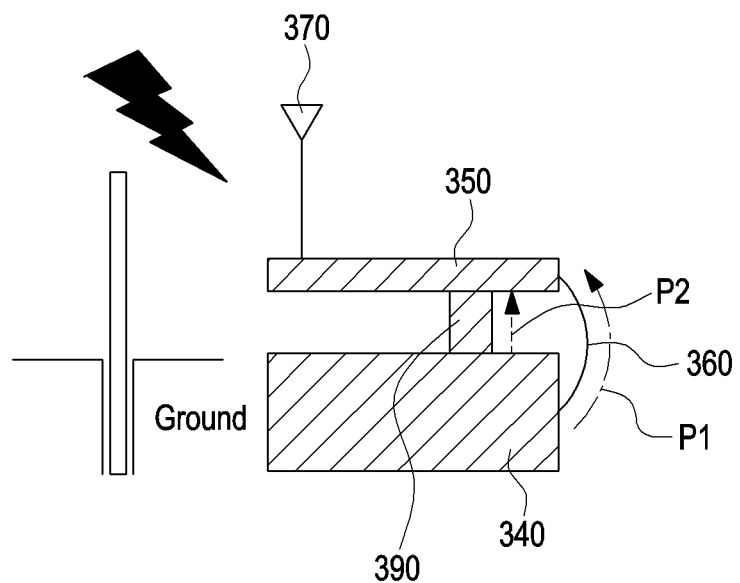
FIG. 7B is a schematic diagram illustrating antenna radiation performance of an electronic device including a connection member, according to an embodiment of the disclosure.

FIG. 7A is a schematic diagram illustrating antenna radiation performance of an electronic device not including a connection member, according to an embodiment of the disclosure. FIG. 7B is a schematic diagram illustrating antenna radiation performance of an electronic device including a connection member, according to an embodiment of the disclosure.

In other words, the electrical movement path L2 of the electric charge in the closed loop shape in the case where the connection member 390 is disposed, described above in FIG. 6B, may be described as an addition of an electrical connection point between the first printed circuit board 350 and the battery 340 as compared to the electrical movement path L1 having an open loop shape. Referring to FIG. 7A, in the case where the connection member 390 is not disposed, only one electrical connection point P1 between the first printed circuit board 350 and the battery 340 may be formed, but, referring to FIG. 7B, in the case where the connection member 390 is disposed, two electrical connection points P1 and P2 between the first printed circuit board 350 and the battery 340 may be formed. In the case of FIG. 7B, two electrical connection points are formed, so that a ground structure (ground) for an antenna operation may be formed in a closed loop shape.

In the case of FIG. 7A, the antenna 370 may have reduced antenna performance due to the occurrence of a parasitic resonance pattern (null), but, in the case of FIG. 7B, the antenna 370 has a stable ground structure, so that a parasitic resonance pattern (null) is removed and the antenna may substantially operate as a monopole antenna. For example, in the case of FIG. 7A, a long and narrow electrical path is formed, so that various electronic components or members on the electrical path are not stably grounded and may operate (parasitic resonance) like an antenna of a specific frequency (e.g., 1.2 GHz, 1.8 GHz). On the other hand, since the case of FIG. 7B provides a more stable ground structure than the case of FIG. 7A, a parasitic resonance pattern may be removed and the performance of the antenna 370 may be improved. For example, in the case of FIG. 7B, a frequency (e.g., 2.4 GHz) of a higher band may be output by using the antenna 370 in a state in which a parasitic resonance pattern is removed.

Figure 8A:
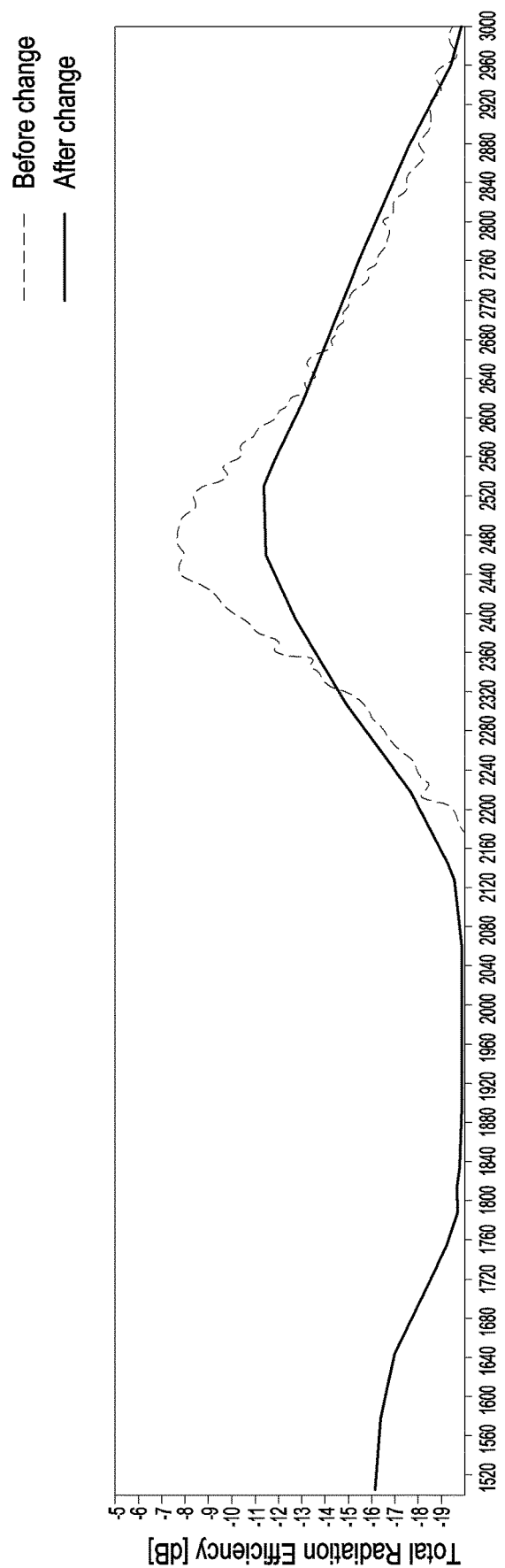
FIG. 8A is a graph illustrating improvement in the magnitude of energy radiated from an antenna of an electronic device including a connection member as compared to an electronic device not including a connection member, according to an embodiment of the disclosure.

FIG. 8A is a graph illustrating improvement in the magnitude of energy radiated from an antenna of an electronic device including a connection member as compared to an electronic device not including a connection member, according to an embodiment of the disclosure.

Figure 8B:
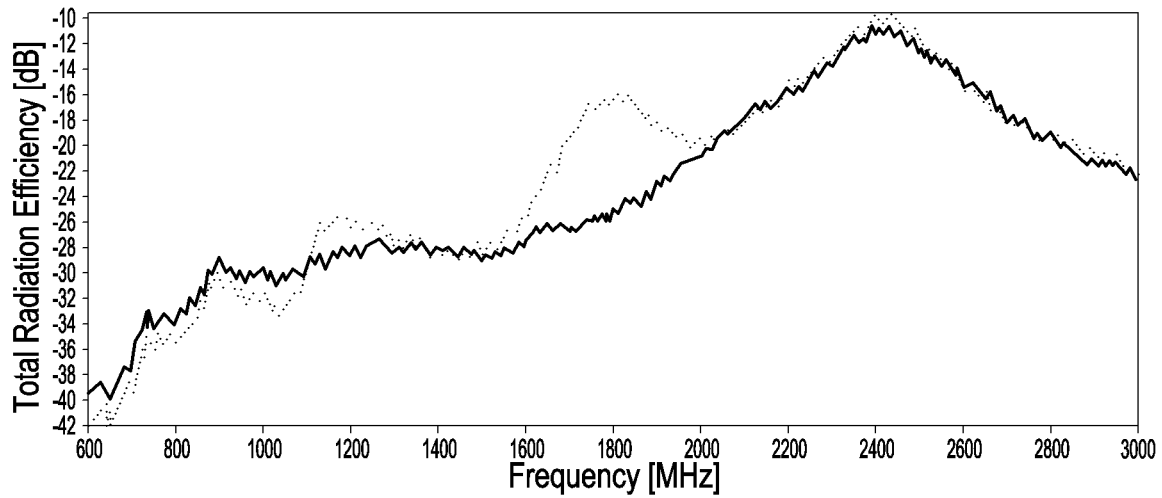
FIG. 8B is a graph illustrating that a parasitic resonance pattern is removed from an electronic device including a connection member as compared to an electronic device not including a connection member, according to an embodiment of the disclosure.

FIG. 8B is a graph illustrating that a parasitic resonance pattern is removed from an electronic device including a connection member as compared to an electronic device not including a connection member, according to an embodiment of the disclosure.

Figure 8C:
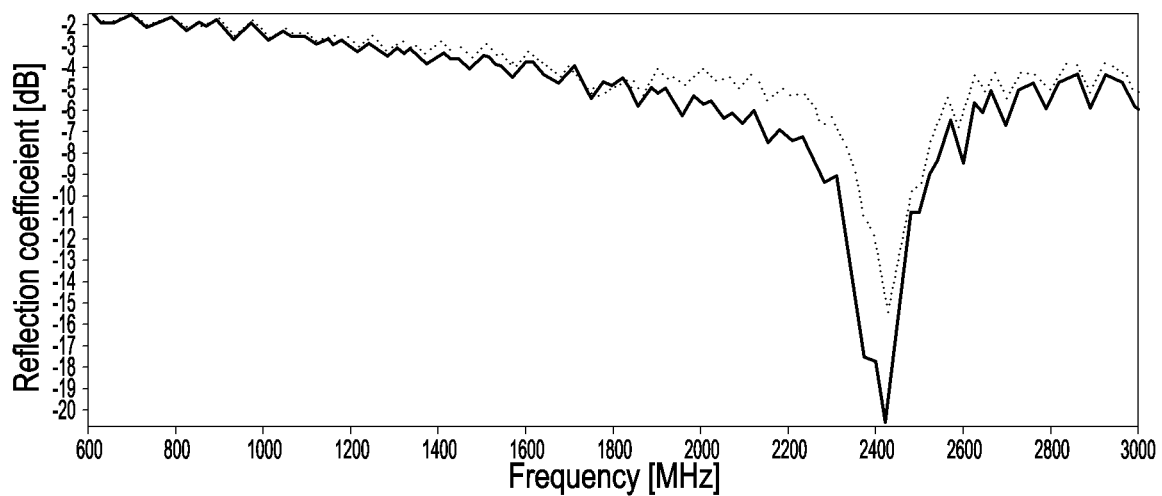
FIG. 8C is a graph illustrating improvement in antenna radiation efficiency of an electronic device including a connection member as compared to an electronic device not including a connection member, according to an embodiment of the disclosure.

FIG. 8C is a graph illustrating improvement in antenna radiation efficiency of an electronic device including a connection member as compared to an electronic device not including a connection member, according to an embodiment of the disclosure.

Referring to FIG. 8A, it may be identified that in the vicinity of a predetermined band (e.g., about 2400 MHz), the magnitude of energy radiated from an antenna of an electronic device (after change, a thick solid line) including a connection member as compared to an electronic device (before change, a dotted line) not including a connection member is improved.

Referring to FIG. 8B, it may be identified that in the vicinity of a predetermined band (e.g., about 1200 MHz and 1800 MHz), a parasitic resonance pattern having been generated in an electronic device (before change, a dotted line) not including a connection member is removed from an antenna of an electronic device (after change, a thick solid line) including a connection member.

Referring to FIG. 8C, it may be identified that in the vicinity of a predetermined band (e.g., about 2400 MHz), the radiation efficiency of an antenna of an electronic device (after change, a thick solid line) including a connection member is improved as compared to an electronic device (before change, a dotted line) not including a connection member.

Figure 9A:
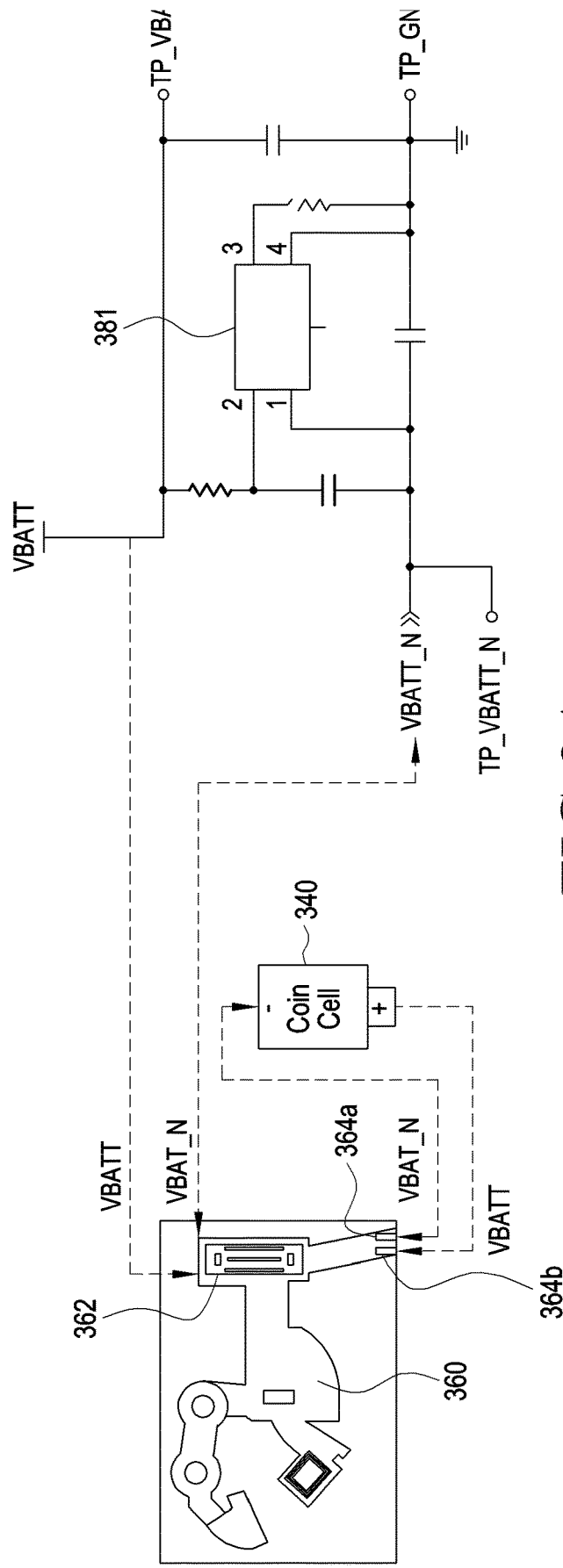
FIG. 9A is a schematic diagram illustrating a circuit structure of an electronic device not including a connection member, according to an embodiment of the disclosure.

FIG. 9A is a schematic diagram illustrating a circuit structure of an electronic device not including a connection member, according to an embodiment of the disclosure.

Figure 9B:
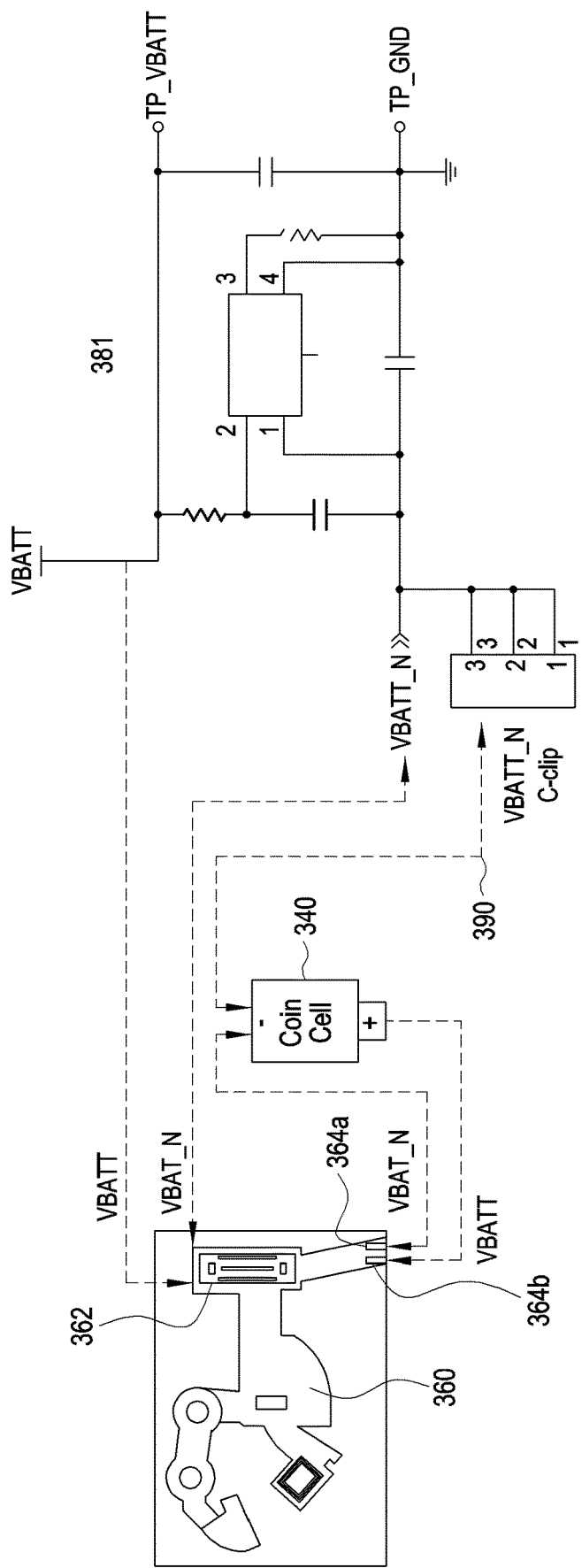
FIG. 9B is a schematic diagram illustrating a circuit structure of an electronic device including a connection member, according to an embodiment of the disclosure.

FIG. 9B is a schematic diagram illustrating a circuit structure of an electronic device including a connection member, according to an embodiment of the disclosure.

Referring to FIG. 9A, in relation to an electronic device which does not separately include a connection member (e.g., the connection member 390 of FIG. 6A), in terms of a circuit structure, there may be no abnormality in a functional operation, but, in terms of performance of an antenna according to electrical connection, instability of a ground form and current density may be caused, and thus the antenna performance may be deteriorated contrary to the design intention.

Accordingly, referring to FIG. 9B, an electrical movement path is additionally formed from the battery 340 to the power management circuit 381 to stabilize a ground form, so that a parasitic resonance disappears and the intended monopole antenna performance may be expected.

Since the coin cell battery does not include a power management circuit (e.g., a protection circuit module) for preventing an overcurrent and thus only positive and negative electrode terminals are formed, the power management circuit may be disposed on the first printed circuit board 350. In the case where the connection member 390 is connected to a ground of the first printed circuit board 350 rather than the power management circuit, an antenna performance improvement effect may be obtained, but overcurrent protection may not be achieved. Therefore, for overcurrent protection, the connection member 390 may be connected to the power management circuit 381 as shown in FIG. 9B.

According to an embodiment, referring to FIG. 9B, the first electrode 341 (e.g., a negative electrode) and the second electrode 342 (e.g., a positive electrode) of the battery 340 are routed on the side surface of the battery 340 through the second printed circuit board 360, and the first electrode 341 of the battery 340 is brought into direct contact with the power management circuit 381 of the first printed circuit board 350 to form an additional parallel ground structure, so that the efficiency of the antenna 370 may be improved, a mounting area in a height direction (Z-axis direction) of the electronic device 300 may be reduced, and overcurrent protection may be achieved.

The electronic device according to an embodiment of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that an embodiment of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An embodiment of the disclosure may provide an electronic device (e.g., the wearable electronic device 300 of FIG. 3) including: a housing (e.g., the housing 310 of FIG. 3); a battery (e.g., the battery 340 of FIG. 3) which is disposed in an inner space of the housing, includes a first surface (e.g., the first surface 340*a* of FIG. 4) facing a first direction (e.g., the Z direction of FIG. 3), a second surface (e.g., the second surface 340*b* of FIG. 4) facing a second direction different from the first direction, and a third surface (e.g., the third surface 340*c* of FIG. 4) facing a third direction different from the first direction and the second direction, and has a first electrode on the first surface and a second electrode on the second surface; a printed circuit board including: a first part (e.g., the first printed circuit board 350 of FIG. 3) disposed to be spaced a predetermined distance apart from the first surface of the battery, and including a power management circuit (e.g., the power management circuit 381 of FIG. 4) configured to provide power used for an operation of the electronic device to at least one electronic component disposed inside the electronic device by using power of the battery; and a second part (e.g., the second printed circuit board 360 of FIG. 3) electrically connected to the battery and disposed to surround at least a part of the second surface and/or the third surface of the battery; an antenna (e.g., the antenna 370 of FIG. 4) electrically connected to the printed circuit board and configured to communicate with an external electronic device; and a connection member (e.g., the connection member 390 of FIG. 6A) disposed on the first surface of the battery and configured to electrically connect the first part of the printed circuit board and the first electrode of the battery.

According to an embodiment, the connection member may be formed to be in contact with the power management circuit.

According to an embodiment, the connection member may form an electrical movement path having a closed-loop shape such that a parasitic resonance pattern of the antenna is removed and the antenna substantially operates as a monopole antenna.

According to an embodiment, the first electrode may be a negative (−) electrode, and the second electrode may be a positive (+) electrode.

According to an embodiment, the connection member may be a C-clip.

According to an embodiment, the printed circuit board may include: a first printed circuit board disposed to be spaced a predetermined distance apart from the first surface of the battery, and including a power management circuit configured to provide power used for an operation of the electronic device to at least one electronic component disposed inside the electronic device by using power of the battery; and a second printed circuit board electrically connected to the battery, having a form of a flexible printed circuit board (FPCB), disposed to surround at least a part of the second surface and/or the third surface of the battery, and contacted with the first printed circuit board.

According to an embodiment, the first printed circuit board and the second printed circuit board may be electrically connected to each other on the third surface through a connector.

According to an embodiment, the second printed circuit board may include a first contact point portion (e.g., the first contact point portion 364a of FIG. 3) connected to the first electrode of the battery, and a second contact point portion (e.g., the second contact point portion 364b of FIG. 3) connected to the second electrode.

According to an embodiment, the battery may have a first electrode tab (e.g., the first electrode tab 343 of FIG. 4) formed on the first surface to extend at least partially parallel to the first surface, and a second electrode tab (e.g., the second electrode tab 344 of FIG. 4) formed on the second surface to extend at least partially parallel to the second surface.

According to an embodiment, the first electrode tab and/or the second electrode tab may include a plate part which is at least partially parallel to the first surface or the second surface and/or a curved part from the plate part toward the third surface of the battery.

According to an embodiment, the first electrode tab and the second electrode tab may be soldered to the first contact point portion and the second contact point portion, respectively, on the third surface of the battery.

According to an embodiment, the antenna may be disposed in the first direction of the printed circuit board.

According to an embodiment, the electronic device may include at least one speaker and/or at least one microphone inside the housing.

According to an embodiment, the electronic device may be a true wireless stereo (TWS) electronic device.

According to an embodiment, the battery may be a coin cell battery.

An embodiment of the disclosure may provide a wearable electronic device (e.g., the wearable electronic device 300 of FIG. 3) capable of implementing a true wireless stereo (TWS) function, the wearable electronic device including: a housing (e.g., the housing 310 of FIG. 3); a battery (e.g., the battery 340 of FIG. 3) which is disposed in an inner space of the housing, includes a first surface (e.g., the first surface 340a of FIG. 4) facing a first direction (e.g., the Z direction of FIG. 3), a second surface (e.g., the second surface 340b of FIG. 4) facing a second direction different from the first direction, and a third surface (e.g., the third surface 340c of FIG. 4) facing a third direction different from the first direction and the second direction, and has a negative electrode on the first surface and a positive electrode on the second surface; a first printed circuit board (e.g., the first printed circuit board 350 of FIG. 3) disposed to be spaced a predetermined distance apart from the first surface of the battery, and including a power management circuit (e.g., the power management circuit 381 of FIG. 4) configured to provide power used for an operation of the electronic device to at least one electronic component disposed inside the electronic device by using power of the battery; a second printed circuit board (e.g., the second printed circuit board 360 of FIG. 3) electrically connected to the battery, disposed to surround at least a part of the third surface of the battery, and contacted with the first printed circuit board on the third surface; an antenna (e.g., the antenna 370 of FIG. 4) electrically connected to the first printed circuit board, adjacently disposed in the first direction of the first printed circuit board, and configured to communicate with an external electronic device; and a connection member (e.g., the connection member 390 of FIG. 6A) disposed on the first surface of the battery and configured to electrically connect the first printed circuit board and the negative electrode of the battery.

According to an embodiment, the connection member may be formed to be in contact with the power management circuit.

According to an embodiment, the connection member may form an electrical movement path having a closed-loop shape such that a parasitic resonance pattern of the antenna is removed and the antenna substantially operates as a monopole antenna.

According to an embodiment, the battery may have a negative electrode tab formed on the first surface to extend at least partially parallel to the first surface, and a positive electrode tab formed on the second surface to extend at least partially parallel to the second surface, and the positive electrode tab and the negative electrode tab may be soldered to a first contact point portion and a second contact point portion of the second printed circuit board, respectively, on the third surface of the battery.

According to an embodiment, the battery may be a coin cell battery.

According to an embodiment, the connection member between the negative electrode of the battery and the power management circuit of the first printed circuit board may form an additional ground structure parallel to a ground structure of the first printed circuit board.

According to an embodiment, the additional ground structure may configure the antenna to substantially operate as a monopole antenna.

According to an embodiment, the negative electrode and the positive electrode of the battery are configured to electrically connect to the second printed circuit board.

Terms as defined in a commonly used dictionary should be interpreted as having the same meaning as in an associated technical context. Unless clearly defined in the disclosure, the terms should not be interpreted as ideally or excessively formal meanings.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing;
a battery, which is disposed in an inner space of the housing, including a first surface facing a first direction, a second surface facing a second direction different from the first direction, a third surface facing a third direction different from the first direction and the second direction, and a first electrode disposed on the first surface and a second electrode disposed on the second surface;
a printed circuit board including a first part disposed to be spaced a predetermined distance apart from the first surface of the battery, a power management circuit configured to provide power used for an operation of the electronic device to at least one electronic component disposed inside the electronic device by using power of the battery, and a second part electrically connected to the battery and disposed to surround at least a part of the second surface and/or the third surface of the battery;
an antenna electrically connected to the printed circuit board and configured to communicate with an external electronic device; and
a connection member disposed on the first surface of the battery and configured to electrically connect the first part of the printed circuit board and the first electrode of the battery.

2. The electronic device of claim 1, wherein the connection member is formed to be in contact with the power management circuit.

3. The electronic device of claim 1, wherein the connection member forms an electrical movement path including a closed-loop shape such that a parasitic resonance pattern of the antenna is removed and the antenna substantially operates as a monopole antenna.

4. The electronic device of claim 1, wherein the first electrode is a negative (−) electrode, and the second electrode is a positive (+) electrode.

5. The electronic device of claim 1, wherein the connection member is a C-clip.

6. The electronic device of claim 1, wherein the printed circuit board comprises:
a first printed circuit board disposed to be spaced a predetermined distance apart from the first surface of the battery, and a power management circuit configured to provide power used for an operation of the electronic device to at least one electronic component disposed inside the electronic device by using power of the battery; and
a second printed circuit board electrically connected to the battery, which is a flexible printed circuit board (FPCB), disposed to surround at least a part of the second surface and/or the third surface of the battery, and contacted with the first printed circuit board.

7. The electronic device of claim 6, wherein the first printed circuit board and the second printed circuit board are electrically connected to each other on the third surface through a connector.

8. The electronic device of claim 6, wherein the second printed circuit board comprises a first contact point portion connected to the first electrode of the battery, and a second contact point portion connected to the second electrode.

9. The electronic device of claim 8, wherein the battery comprises a first electrode tab formed on the first surface to extend at least partially parallel to the first surface, and a second electrode tab formed on the second surface to extend at least partially parallel to the second surface.

10. The electronic device of claim 9, wherein the first electrode tab and/or the second electrode tab comprises a plate part at least partially parallel to the first surface or the second surface and/or a curved part from the plate part towards the third surface of the battery.

11. The electronic device of claim 9, wherein the first electrode tab and the second electrode tab are soldered to the first contact point portion and the second contact point portion, respectively, on the third surface of the battery.

12. The electronic device of claim 1, wherein the antenna is disposed in the first direction of the printed circuit board.

13. The electronic device of claim 1, wherein the electronic device is a wearable electronic device comprising at least one speaker and/or at least one microphone inside the housing.

14. The electronic device of claim 1, wherein the electronic device is a true wireless stereo (TWS) electronic device.

15. The electronic device of claim 1, wherein the battery is a coin cell battery.

16. A wearable electronic device capable of implementing a true wireless stereo (TWS) function, the wearable electronic device comprising:
a housing;
a battery, which is disposed in an inner space of the housing, including a first surface facing a first direction, a second surface facing a second direction different from the first direction, a third surface facing a third direction different from the first direction and the second direction, and a negative electrode disposed on the first surface and a positive electrode disposed on the second surface;
a first printed circuit board, which is disposed to be spaced a predetermined distance apart from the first surface of the battery, including a power management circuit configured to provide power used for an operation of the wearable electronic device to at least one electronic component disposed inside the wearable electronic device by using power of the battery;
a second printed circuit board electrically connected to the battery, disposed to surround at least a part of the third surface of the battery, and contacted with the first printed circuit board on the third surface;
an antenna electrically connected to the first printed circuit board, adjacently disposed in the first direction of the first printed circuit board, and configured to communicate with an external electronic device; and
a connection member disposed on the first surface of the battery and configured to electrically connect the first printed circuit board and the negative electrode of the battery.

17. The wearable electronic device of claim 16, wherein the connection member is formed to be in contact with the power management circuit.

18. The wearable electronic device of claim 16, wherein the connection member forms an electrical movement path comprising a closed-loop shape such that a parasitic resonance pattern of the antenna is removed and the antenna substantially operates as a monopole antenna.

19. The wearable electronic device of claim 16,
wherein the battery comprises a negative electrode tab formed on the first surface to extend at least partially parallel to the first surface, and a positive electrode tab formed on the second surface to extend at least partially parallel to the second surface, and wherein the positive electrode tab and the negative electrode tab are soldered to a first contact point portion and a second contact point portion of the second printed circuit board, respectively, on the third surface of the battery.

20. The wearable electronic device of claim 16, wherein the battery is a coin cell battery.

\* \* \* \* \*